(12) United States Patent
Bucknell

(10) Patent No.: US 8,251,037 B2
(45) Date of Patent: Aug. 28, 2012

(54) CYLINDER HEAD FOR IMPROVED FLUID FLOW PERFORMANCE

(75) Inventor: John R. Bucknell, Royal Oak, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 319 days.

(21) Appl. No.: 12/720,179

(22) Filed: Mar. 9, 2010

(65) Prior Publication Data

US 2011/0220054 A1   Sep. 15, 2011

(51) Int. Cl.
*F01L 3/06* (2006.01)
(52) U.S. Cl. .................. 123/188.1; 123/193.5
(58) Field of Classification Search ............... 123/193.5, 123/188.1, 188.2, 188.4; 29/888.06; 92/163; 137/625, 625.28, 625.33, 625.35
See application file for complete search history.

(56) References Cited

U.S. PATENT DOCUMENTS

| | | | |
|---|---|---|---|
| 2,988,080 A * | 6/1961 | Rankl | 123/188.2 |
| 4,086,883 A * | 5/1978 | Steiger | 123/23 |
| 4,137,886 A * | 2/1979 | Hiramatsu | 123/188.11 |
| 5,301,640 A * | 4/1994 | Barranco, Jr. | 123/188.3 |

* cited by examiner

*Primary Examiner* — M. McMahon
(74) *Attorney, Agent, or Firm* — Cantor Colburn LLP

(57) ABSTRACT

A fluid flow valve in a cylinder head comprises a first valve end and an axially disposed second shaft end connected by a valve shaft. A first valve member is located at the first valve end and a second valve member is located axially from, and in fixed relationship to, the first valve member along the valve shaft. A valve support extends axially between and connects the first valve member and the second valve member; the valve support including an axially extending wall portion having circumferentially spaced support struts extending radially between the valve shaft and the wall portion. Fluid flow passages extend axially through the wall portion, between the circumferentially spaced support struts, wherein fluid flows simultaneously about the exterior of the wall portion and through the fluid flow passages in the wall portion when the valve member is biased to an open position.

12 Claims, 4 Drawing Sheets

CYLINDER HEAD FOR IMPROVED FLUID FLOW PERFORMANCE

FIELD OF THE INVENTION

Exemplary embodiments of the present invention are related to cylinder heads for managing fluid flow, and, more specifically, to a cylinder head having pressure balanced poppet valves for improved fluid flow performance at high speeds and low valve lifts.

BACKGROUND

Designers of modern, high performance piston devices such as internal combustion engines and piston expanders, for example, are confronted by many engineering challenges not the least of which includes achieving desired fluid flow rates into, and out of the piston chamber, especially at high speeds (revolution/RPM). High speed piston-cylinder operation is primarily limited by valve opening time and valve area. As the speed of the piston-cylinder device is increased the valve lift is, of necessity, smaller. Valve actuation forces are also of concern in that high actuation forces have a negative effect on operating efficiency. In internal combustion engines, four-valve applications have substantial advantages over two-valve designs in terms of the valve area as it relates to the piston bore area. The addition of more valves has proven to be advantageous from a mass air flow perspective. However, additional valves significantly increase the complexity, size, cost and mass of the valve train. In addition, the application of multiple valves has introduced issues related to flow and motion caused by the introduction of separate flow streams into the piston chamber.

SUMMARY OF THE INVENTION

In an exemplary embodiment, a fluid flow valve for controlling the flow of a fluid in a cylinder head of a piston-cylinder apparatus comprises a first valve end and a second shaft end disposed axially therefrom and connected by a valve shaft. A first valve member is located at the first valve end and has a valve seating surface disposed on an upper face thereof. A second valve member is located axially from, and in fixed relationship to, the first valve member along the valve shaft and has a valve seating surface disposed on an upper face thereof. A valve support extends axially between and connects the first valve member and the second valve member; the valve support including an axially extending wall portion having circumferentially spaced support struts extending radially between the valve shaft and the wall portion. Fluid flow passages extend axially through the wall portion, between the circumferentially spaced support struts, wherein fluid flows simultaneously about the exterior of the wall portion and through the fluid flow passages in the wall portion when the valve member is biased to an open position.

In another exemplary embodiment, a method of manufacturing a cylinder head for piston-cylinder apparatus having a fluid flow valve for controlling the flow of a pressurized fluid into and out of a chamber disposed therein and comprising a first valve end and a second shaft end disposed axially therefrom and connected by a valve shaft, a first valve member located at the first valve end and having a valve seating surface disposed on an upper face thereof, a second valve member located axially from, and in fixed relationship to, the first valve member along the valve shaft and having a valve seating surface disposed on an upper face thereof, and a valve support extending axially between and connecting the first valve member and the second valve member, the valve support including an axially extending wall portion having circumferentially spaced support struts extending radially between the valve shaft and the wall portion, comprises inserting a rotating valve seat pocket cutter including first and second axially spaced cutting heads, that are fixed relative to one another and are separated by an axial length separating the first valve member and the second valve member of the intake valve or the exhaust valve, into an inlet opening or an outlet opening in the chamber of the cylinder head. Simultaneously cutting first and second valve seat pockets in the cylinder head from within the chamber.

The above features and advantages, and other features and advantages of the present invention are readily apparent from the following detailed description of the invention when taken in connection with the accompanying drawings.

BRIEF DESCRIPTION OF THE DRAWINGS

Other features, advantages and details appear, by way of example only, in the following description of embodiments, the description referring to the drawings in which.

DESCRIPTION OF THE EMBODIMENTS

Figure 1:
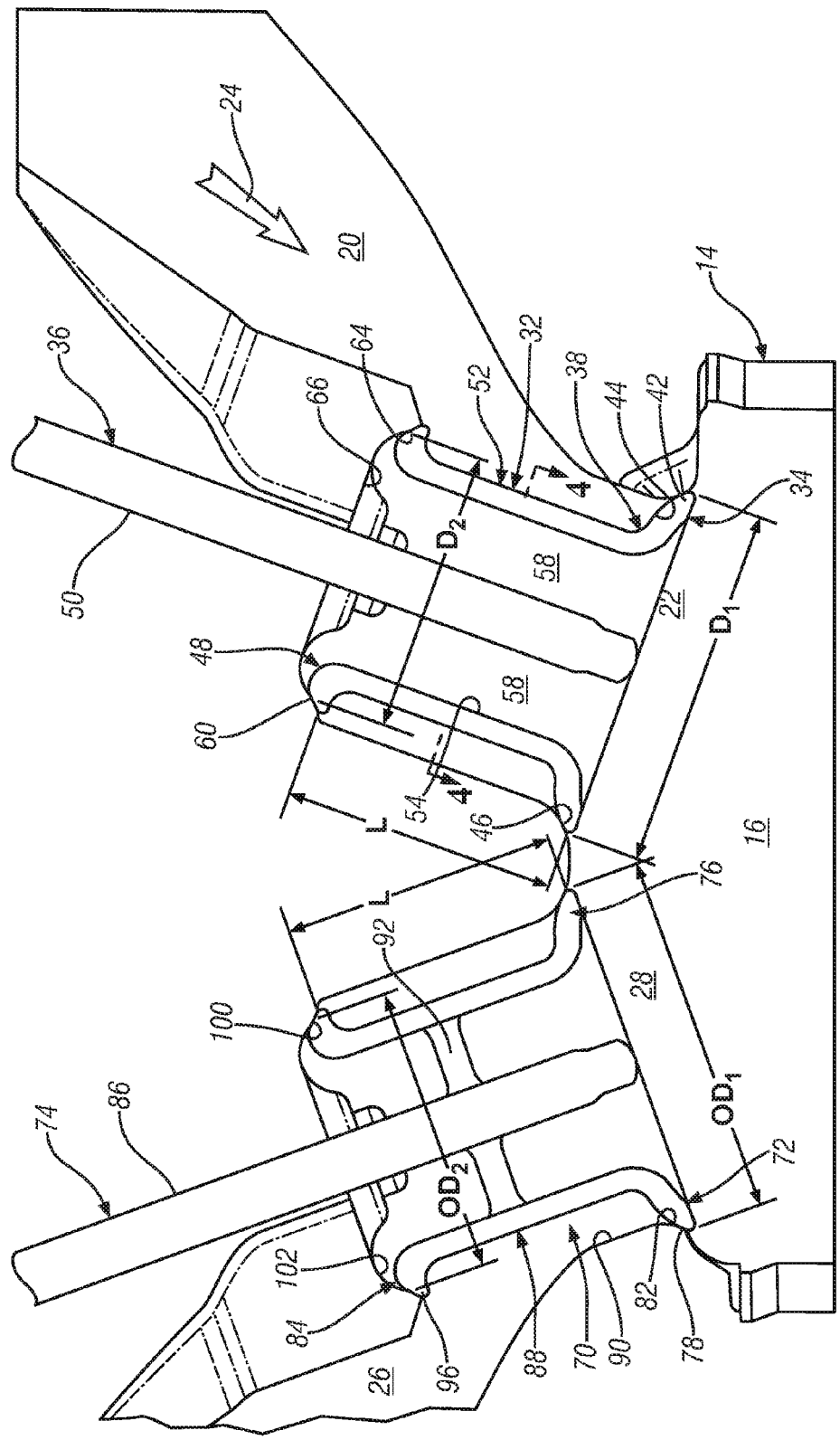
FIG. 1 is a partial, sectional view of cylinder head inlet and outlet ports and an associated piston chamber of a cylinder head for a piston-cylinder apparatus, embodying features of the invention.

The following description is merely exemplary in nature and is not intended to limit the present disclosure, application or uses. It should be understood that throughout the drawings, corresponding reference numerals indicate like or corresponding parts and features.

Figure 2:
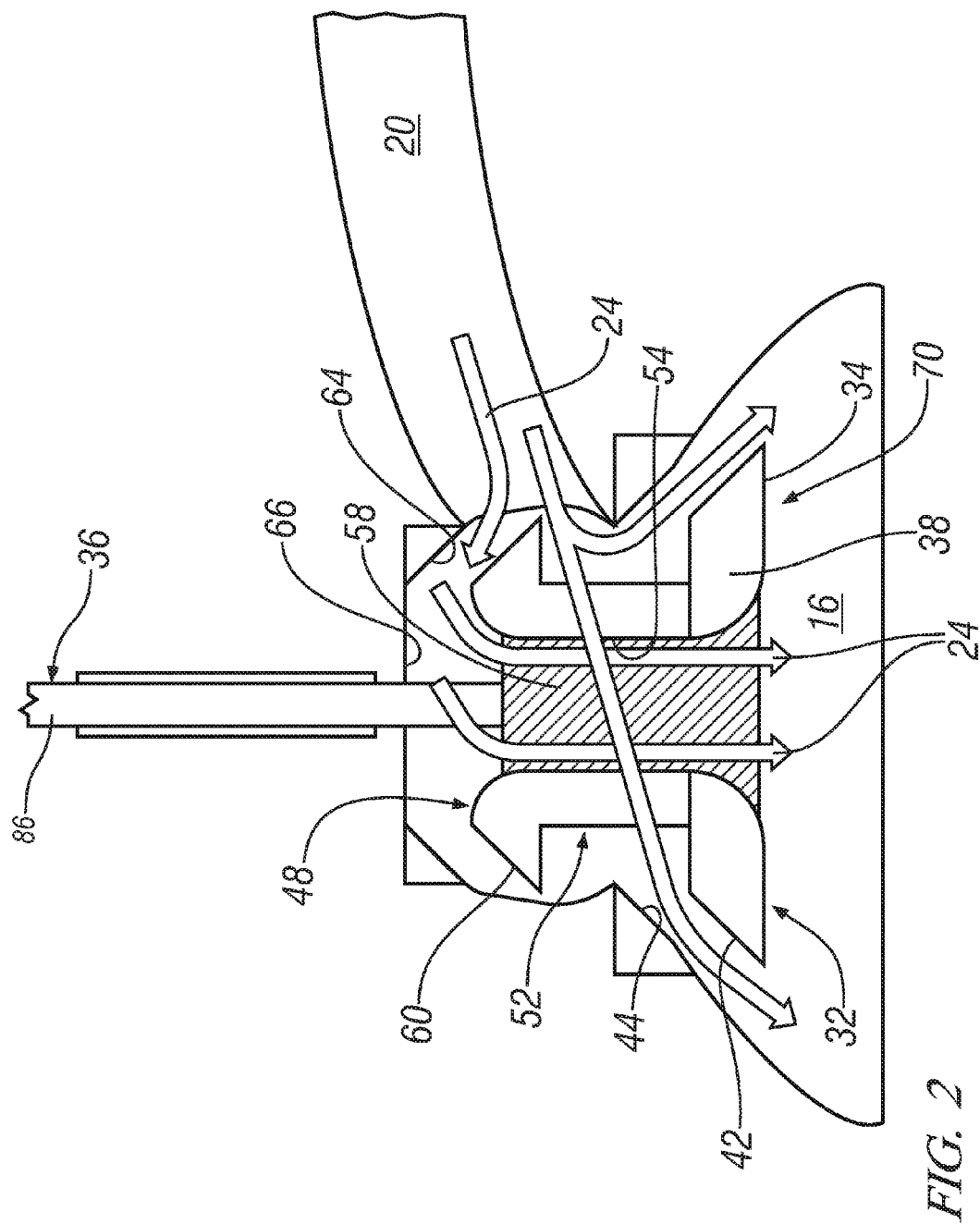
FIG. 2 is a schematic, sectional view of an inlet valve of the cylinder head of FIG. 1 illustrating fluid flow therethrough.
Figure 3:
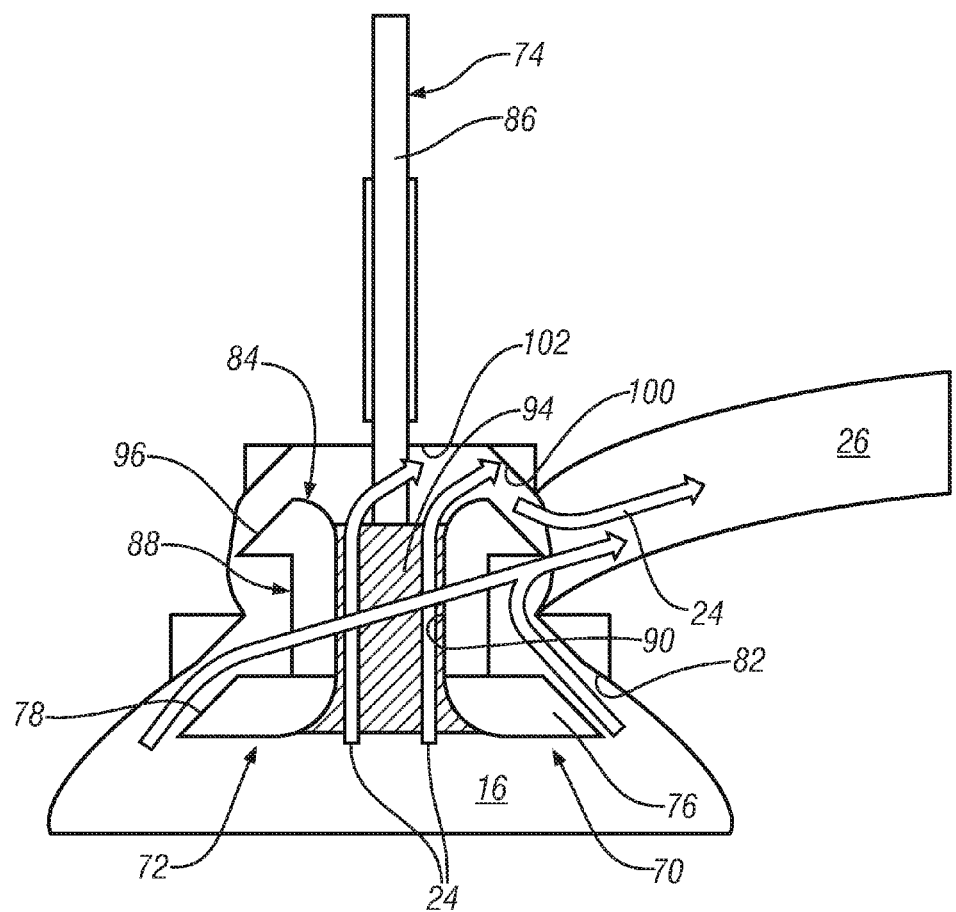
FIG. 3 is a schematic, sectional view of an outlet valve of the cylinder head of FIG. 1 illustrating fluid flow therethrough.

Referring now to FIGS. 1-3, an exemplary embodiment of the invention is directed to a cylinder head 14 for piston-cylinder apparatus such as an internal combustion engine or a piston-cylinder expander, for example. The cylinder head 14 is configured to define one or more chambers 16. A fluid flow port such as inlet port 20, in fluid communication with an intake system (not shown), extends through the cylinder head 14 and opens into the chamber 16 through an intake opening 22. A pressurized fluid 24 (ex. combustion air in an internal combustion engine) flows from the intake system and into the chamber 16 through the intake opening 22. Similarly, another fluid flow port, such as outlet port 26 in fluid communication with an outlet system (not shown) extends through the cylinder head 14 and opens into the chamber 16 through an outlet opening 28. Pressurized fluid 24 (ex. exhaust gas in an internal combustion engine), FIG. 3, exits the chamber 16 through the outlet port 26 and to an outlet system (not shown) following the release of energy in the chamber 16.

Figure 4:
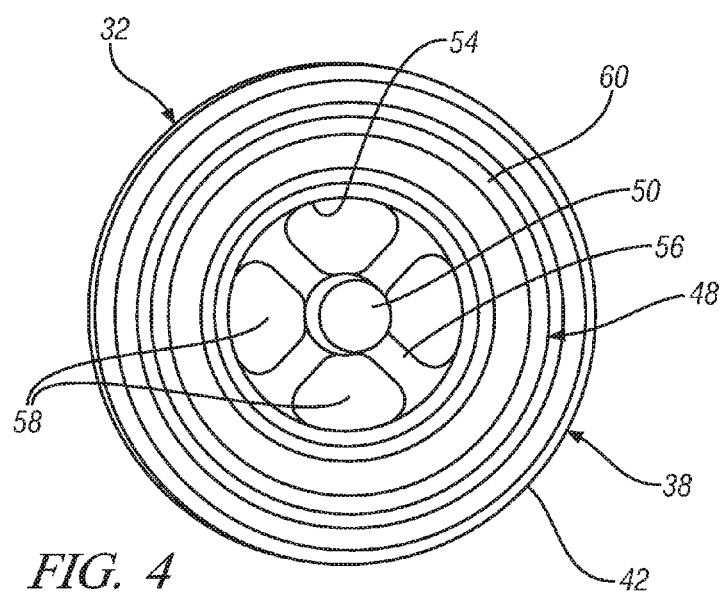
FIG. 4 is a sectional view of the inlet valve of FIG. 1 taken along line 4-4.

Disposed for reciprocal motion within the inlet port 20 is a fluid flow valve such as inlet valve 32. The inlet valve 32 extends axially from a first, valve end 34 disposed in the inlet port 20 to a second, shaft end 36 extending out of the cylinder head 14 for engagement with valve actuators (not shown). Disposed at the first, valve end 34 of the inlet valve 32 is a first valve member 38. The first valve member has a diameter "$D_1$" and includes a first seating surface 42 on the upper face thereof. The valve seating surface 42 is configured to sealingly engage a valve seat 44 that extends about the inlet opening 22 of the inlet port 20 and is configured to mate with the first valve member 38 to facilitate sealing therebetween. A second valve member 48 is located axially from the first valve member 38 a distance "L" along the valve shaft 50. The second valve member 48 is connected to or integral with the first valve member 38 through a valve support 52 that extends therebetween. The valve support 52 may have any one of a number of configurations. In the exemplary embodiment shown in FIGS. 1 and 4, the valve support comprises an axially extending cylindrical wall portion 54 having support struts 56 extending radially between the valve shaft 50 and the cylindrical wall portion. The support struts 56 are circumferentially spaced from one another and define fluid passages 58 that extend axially through the cylindrical wall portion 54. The second valve member has a diameter "$D_2$", where $D_1 > D_2$, and includes a second seating surface 60 on the upper face thereof. The second seating surface 60 is configured to sealingly engage a second valve seat 64 in the roof 66 of the inlet port 20. The second valve seat 64 is configured to mate with the second valve member 48 to facilitate sealing therebetween.

Referring to FIG. 1, when the reciprocating inlet valve 32 is biased to a closed position the seating surface 42 of the first valve member 38 is sealingly engaged with the valve seat 46 and the second seating surface 60 of the second valve member 48 is similarly engaged with the second valve seat 64 in the inlet port roof 66. In this configuration, pressurized fluid 24 in the inlet port 20 is blocked from flowing into the chamber 16. Referring to FIG. 2, when the reciprocating inlet valve 32 is biased to an open position, the seating surface 42 of the first valve member 38 is moved off of the valve seat 44 allowing pressurized fluid 24 to flow into the chamber 16. Simultaneously, the second valve seat 60 of the second valve member 48 is moved out of sealing engagement with the second valve seat 64 in the inlet port roof 66 allowing pressurized fluid 24 to flow between the valve seating surface 60 and the second valve seat 64 and through the air passages 58 in the valve support 52 and into the combustion chamber. Because the inlet valve 32 has close to double the valve seat area, the flow volume of pressurized fluid 24 into the chamber 16 is increased proportionately, especially in low valve lift applications. For applications requiring large air flow rates at low valve lifts, the disclosed intake valve geometry is beneficial. In addition, because the diameters $D_1$ and $D_2$ vary only slightly, the pressure differential across the first valve end 34 of the inlet valve 32 is nearly balanced resulting in a significant reduction in the biasing forces required to move the inlet valve 32 from an open to a closed position and vice-versa. The reduction in biasing force required to reciprocate the inlet valve 32 improves the overall efficiency of the piston-cylinder apparatus by reducing the parasitic loads of valve actuation. In one example, the actuation load of an inlet valve 32 of an internal combustion engine having a diameter $D_1 = 29$ mm located in an inlet port 20 having a pressure differential of 0.2 MPa across the valve dropped from 130N to 1.7N while almost doubling the pressurized fluid flow 24 at low valve lifts.

Referring to FIGS. 1 and 3, disposed for reciprocal motion within the outlet port 26 is a fluid flow valve such as outlet valve 70. The outlet valve 70 extends axially from a first, valve end 72 disposed in the outlet port 26 to a second, shaft end 74 extending out of the cylinder head 14 for engagement with valve actuators (not shown). Disposed at the first, valve end 72 of the outlet valve 70 is a first valve member 76. The first valve member 76 has a diameter "$OD_1$" and includes a first seating surface 78 on the upper face thereof. The first seating surface 78 is configured to sealingly engage a valve seat 82 that extends about the outlet opening 28 of the outlet port 26 and is configured to mate with the first valve member 76 to facilitate sealing therebetween. A second valve member 84 is located axially from the first valve member 76 a distance "L" along the valve shaft 86. The second valve member 84 is connected to or integral with the first valve member 76 through a valve support 88 that extends therebetween. The valve support 88 may have any one of a number of configurations. In the exemplary embodiment shown in FIGS. 1 and 3, the valve support comprises an axially extending cylindrical wall portion 90 having support struts 92 extending radially between the valve shaft 86 and the cylindrical wall portion 90. The support struts 92 are circumferentially spaced from one another and define outlet passages 94 that extend axially through the cylindrical wall portion 90. The second valve member 84 has a diameter "$OD_2$", where $OD_1 > OD_2$, and includes a second seating surface 96 on the upper face thereof. The second seating surface 96 is configured to sealingly engage a second valve seat 100 in the roof 102 of the outlet port 26. The second valve seat 100 is configured to mate with the second valve member 84 to facilitate sealing therebetween.

Referring to FIG. 1, when the reciprocating outlet valve 70 is biased to a closed position, the seating surface 78 of the first valve member 76 is sealingly engaged with the valve seat 82 and the second seating surface 96 of the second valve member 84 is similarly engaged with the second valve seat 100 in the outlet port roof 102. In this configuration, pressurized fluid 24 in the chamber 16 is blocked from flowing into the outlet port 26. Referring to FIG. 3, when the reciprocating outlet valve 70 is biased to an open position, the valve seat 78 of the first valve member 76 is moved off of the second seating surface 82 allowing pressurized fluid 24 to flow out of the chamber 16 through the outlet port 26. Simultaneously, the second valve seat second seating surface 96 of the second valve member 84 is moved out of sealing engagement with the second valve seat 100 in the outlet port roof 102 allowing pressurized fluid 24 to flow between the valve seating surface 96 and second valve seat 100 and through the outlet passages 94 in the valve support 88 and out of the chamber 16. Because the outlet valve 70 has about double the valve seat area of a conventional poppet valve, the flow volume of pressurized fluid 24 out of the chamber 16 is increased proportionately, especially in low valve lift applications. For applications requiring large flow rates at low valve lifts, the disclosed outlet valve geometry is beneficial. In addition, because the diameters $OD_1$ and $OD_2$ vary only slightly, the pressure differential across the first valve end 72 of the outlet valve 70 is nearly balanced resulting in a significant reduction in the biasing forces required to move the outlet valve 70 from an open to a closed position and vice-versa. The reduction in biasing force required to reciprocate the outlet valve 70 improves the overall efficiency of the piston-cylinder apparatus by reducing the parasitic loads of valve actuation.

Figure 5:
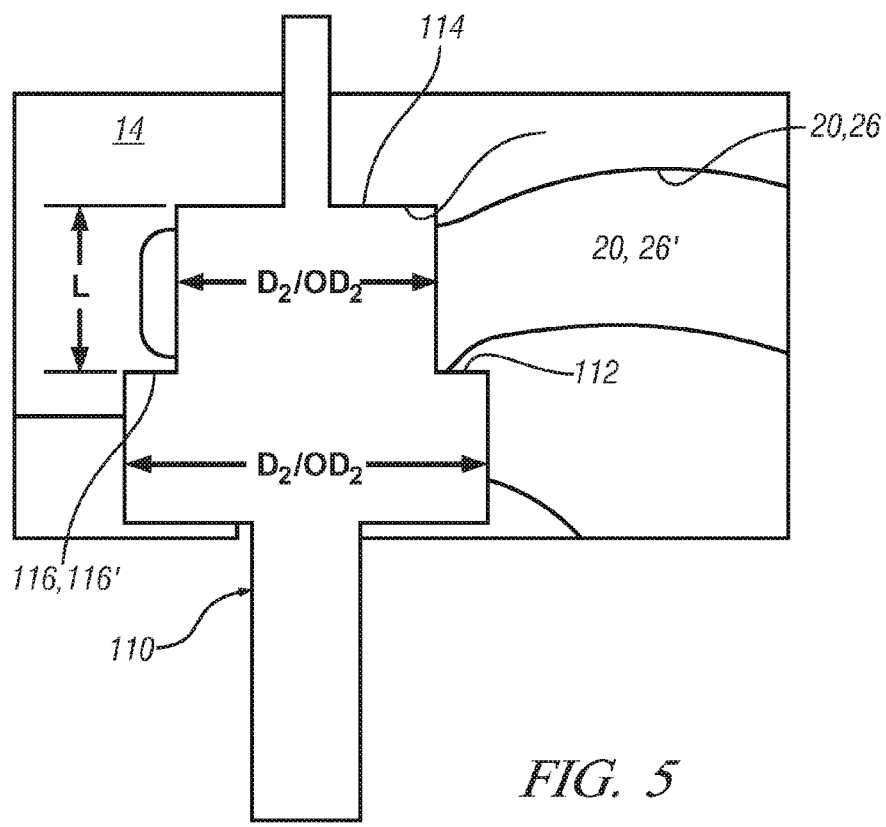
FIG. 5 is a schematic view of an apparatus for machining the valve seat pockets of the cylinder head of FIG. 1.

Both the inlet valve 32 and the outlet valve 70 described above have a simplified geometry that allows for ease of manufacturing both the valves 32, 70 and the cylinder head 14. The inlet and outlet valves 32, 70 respectively, may be net forged or cast and the valve seating surfaces 42, 60 and 78, 96 respectively, are subsequently ground to a desired finish. In an exemplary embodiment illustrated in FIGS. 5 and 6, apparatus for machining the cylinder head 14 is shown. In FIG. 5, the apparatus includes a rotating valve seat pocket cutter 110 that includes first and second, axially spaced cutting heads 112 and 114 respectively, that are fixed relative to one another and are separated by an axial length "L"; the same axial distance separating the first valve member 38 and the second valve member 48 of the inlet valve 32 or the same axial distance separating the first valve member 76 from the second valve member 84 of the outlet valve 70. With valve diameters $D_1 > D_2$ for the intake valve 32 and $OD_1 > OD_2$ for the exhaust valve 70, the valve seat pockets 116 and 118 may be simultaneously and precisely ground from the chamber 16 of the cylinder head 14 for the inlet port 20 and the valve seat pockets 116' and 118' may be simultaneously and precisely ground from the chamber 16 side of the cylinder head 14 for the outlet port 26.

Figure 6:
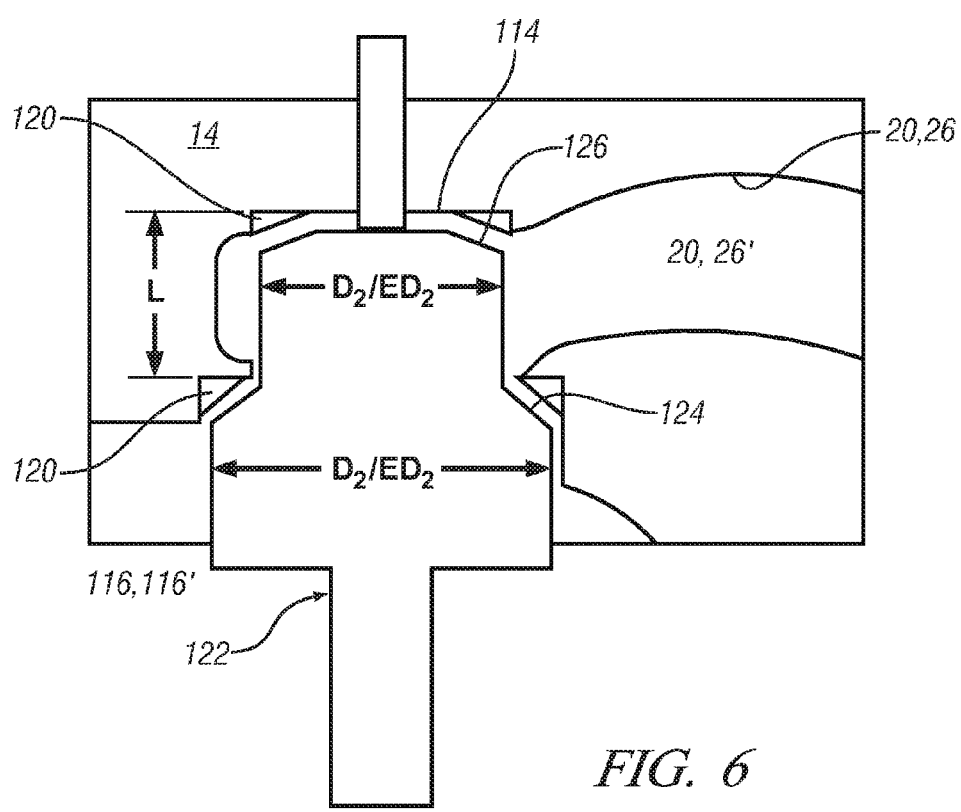
FIG. 6 is a schematic view of an apparatus for machining the valve seats of the cylinder head of FIG. 1.

In an exemplary embodiment, in instances in which hardened valve seat inserts 120, FIG. 6, are utilized in cylinder heads 14 constructed of softer alloys, a similarly configured, rotating valve seat grinder 122 may be utilized having first and second, axially spaced grinding heads 124 and 126 designed to machine or grind the valve seat inserts 120 to form suitable valve seating surfaces thereon. Such a valve design allows for simple machining of a monolithic (i.e. single piece) cylinder head 14 which has not been possible with other valve designs.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the present application.

What is claimed is:

1. A fluid flow valve for controlling the flow of a fluid in a cylinder head of a piston-cylinder apparatus comprising:
   a first valve end and a second shaft end disposed axially therefrom and connected by a valve shaft;
   a first valve member located at the first valve end and having a valve seating surface disposed on an upper face thereof;
   a second valve member located axially from, and in fixed relationship to, the first valve member along the valve shaft and having a valve seating surface disposed on an upper face thereof;
   a valve support extending axially between and connecting the first valve member and the second valve member, the valve support including an axially extending wall portion having circumferentially spaced support struts extending radially between the valve shaft and the wall portion; and
   fluid flow passages extending axially through the wall portion between the circumferentially spaced support struts, wherein fluid flows simultaneously about the exterior of the wall portion and through the fluid flow passages in the wall portion when the valve members are biased to an open position.

2. The fluid flow valve of claim 1, wherein the valve is net forged or cast as a single piece.

3. The fluid flow valve of claim 1, the first valve member having a first diameter and the second valve member having a second diameter and wherein the first diameter is greater than the second diameter.

4. The fluid flow valve of claim 1, wherein the piston cylinder apparatus is an internal combustion engine.

5. The fluid flow valve of claim 1, wherein the piston cylinder apparatus is a piston-cylinder expander.

6. A cylinder head assembly for a piston-cylinder apparatus comprising:
   a chamber;
   a fluid flow port extending through the cylinder head and opening into the chamber through an opening;
   a fluid flow valve, for controlling the flow of fluid to and from the chamber, disposed for reciprocal motion in the opening comprising:
   a first valve end and a second shaft end disposed axially therefrom and connected by a valve shaft, the second shaft end extending outwardly of the cylinder head;
   a first valve member located at the first valve end and having a valve seating surface disposed on an upper face thereof and configured to sealing engage a first valve seat extending about the opening of the cylinder head fluid flow port;
   a second valve member located axially from, and in fixed relationship to, the first valve member along the valve shaft and having a valve seating surface disposed on an upper face thereof and configured to sealingly engage a second valve seat disposed in a roof portion of the cylinder head fluid flow port; and
   a valve support extending axially between and connecting the first valve member and the second valve member, the valve support including an axially extending wall portion having circumferentially spaced support struts extending radially between the valve shaft and the wall portion and fluid flow passages extending axially through the wall portion between the circumferentially spaced support struts, and wherein pressurized fluid flows, when the valve member is moved to an open position such that the first valve member is open off of the first valve seat and the second valve member is open off of the second valve seat, and fluid flow simultaneously about the exterior of the wall portion and through the fluid flow passages in the cylindrical wall portion.

7. The cylinder head assembly of claim 6, wherein the fluid flow port is an inlet port and the fluid flow valve is an inlet valve for controlling the flow of pressurized fluid air to the chamber.

8. The cylinder head assembly of claim 6, wherein the fluid flow port is an outlet port and the fluid flow valve is an outlet valve for controlling the flow of pressurized fluid from the chamber.

9. The cylinder head assembly of claim 6, wherein the first valve member having a first diameter and the second valve member having a second diameter and wherein the first diameter is greater than the second diameter.

10. The cylinder head assembly of claim 9, wherein the fluid flow through the fluid flow port is about double that of a conventional poppet valve.

11. The fluid flow valve of claim 6, wherein the piston-cylinder apparatus is an internal combustion engine.

12. The fluid flow valve of claim 6, wherein the piston-cylinder apparatus is a piston-cylinder expander.

* * * * *